Patented Dec. 23, 1930

1,786,097

UNITED STATES PATENT OFFICE

ERICH THILO, OF BERLIN, GERMANY, ASSIGNOR TO ADOLF HEICKE, OF BERLIN, GERMANY

METHOD OF PRODUCING BICALCIUM PHOSPHATE FROM SULPHUROUS SOLUTIONS

No Drawing. Application filed September 24, 1929, Serial No. 394,916, and in Germany February 11, 1928.

This invention relates to a method of producing bicalciumphosphate from sulphurous solutions, and has for its object to generally improve on processes of this kind.

More particularly the invention relates to a method of producing bicalciumphosphate of high purity, which is substantially free from sulphite, from solutions of tricalciumphosphate such as are obtained by treating bones, crude mineral phosphates or so-called Thomas slag with watery sulphurous acid. In accordance with certain known methods, free acid or acid salts are added to such solutions in such amount that upon expelling the sulphurous acid, calcium sulphite is incapable of being precipitated.

According to one of the known methods referred to, the sulphurous acid, for the purpose of precipitation of the bicalciumphosphate is expelled by boiling.

This method has the disadvantage that large amounts of steam are required, which, in conducting operations on a large scale, are necessarily withdrawn from the boiler system in irregular manner, thus causing undesirably great fluctuations in pressure, which in turn are considerably prejudicial to the whole operation. The known method necessitates the use of homogeneously leaded iron boiling apparatus, which on account of the different temperature expansion coefficients of lead and iron are very sensitive to the sudden fluctuations in pressure. Besides the method in question returns to the system a hot sulphurous acid charged with a very large amount of steam, so that the same for the majority of purposes, and more particularly for the solution of tricalciumphosphate, for example from bones, must be cooled down again to a lower temperature.

Chiefly, however, it has been the expensive homogeneously leaded apparatus, which frequently requires repair, and the heavy and irregular consumption of steam, which has constituted the reason why the digestion method with sulphurous acid (not unduly affecting the raw material, i. e., bones) has not been more generally adopted.

According now to the invention the sulphurous acid is expelled at ordinary temperature by means of a permanent gas which reacts neither with the $SO_2$ nor with the lime salts contained in the solution. This, for example, may be effected by conducting air through the solution for such length of time that all sulphurous acid has been forced out.

The method according to the invention is based on the fact that calcium sulphite in weak acid solution, according to the formula

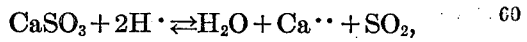
$$CaSO_3 + 2H^{\cdot} \rightleftharpoons H_2O + Ca^{\cdot\cdot} + SO_2,$$

is, up to the extent of equilibrium, dissociated into water, $Ca^{\cdot\cdot}$ ions and $SO_2$, so that when air is passed through a solution of this kind the equilibrium is displaced by the removal of the $SO_2$ and the latter is supplied from the calcium sulphite. Upon the passage of the air there of course occurs to some extent oxidation of the $SO_2$ to form sulphuric acid, but this is only very slight, and without any practical importance if the precipitation of the bicalciumphosphate occurs rapidly, such as takes place in the presence of calcium ions in excess amount.

This method possesses over all hitherto known methods the advantage that the large amounts of steam otherwise required for boiling purposes are dispensed with and sudden fluctuations of pressure in the boiler system avoided. Homogeneously leaded boiling apparatus are not required, and the process may be carried out for example in wooden or stone vessels, which are considerably cheaper and moreover completely eliminate any contamination of the phosphate with heavy metals, in particular lead. Should the process nevertheless be conducted in lead vessels, it will be found that the "cold process" offers advantages in so far as the sudden expansion fluctuations of the lead and iron apparatus occurring during the boiling are avoided, the wear thus being considerably reduced, while in addition the possibility of contamination of the phosphate by the lead (on account of the low temperature) is practically wholly precluded. Finally, an almost dry and also cold $SO_2$ is supplied, which accordingly, as a solvent for tricalciumphosphate from, for example bones does not require to be cooled.

Only $Ca^{\cdot\cdot}$ ions have, theoretically an undesirable effect on the equilibrium referred to above (due to the limited solubility of $SO_2$ in water the $SO_2$ concentration is of no importance). Particular experiments have shown, however, that even in the case of very high $Ca^{..}$ ion concentration, deposits of bicalciumphosphate are obtained from weak acid solutions, which contain a maximum of 2% $SO_2$, a purity in this respect which is not surpassed even in the case of the deposits obtained by boiling out the $SO_2$. Water-soluble salts, which contain neither $Ca^{..}$ nor $SO_3$ ions, have no influence on the equilibrium, and do not, assuming the same are in the solution, vary the composition of the deposit.

The following specific procedure is illustrative:

1.1 kg. crude phosphate from Algeria, containing 66% tricalcium phosphate, 16% calcium carbonate and 19% impurities insoluble in aqueous sulphurous acid was powdered and intermixed with 11 kg. water so as to form a suspension into which 1.5 kg. gaseous sulphur dioxide, which amount was required to saturate the suspension, were introduced at room temperature. The treated suspension was left standing for 24 hours at room temperature whereafter the insoluble residue was separated from the solution and 0.9 kg. of 20° Bé. or 32% hydrochloric acid were slowly added. Finally a current of air was blown through the solution at room temperature. The effect of this treatment was the formation of a deposit of 7.3 kg. which contained about 94% dicalcium phosphate, 4% gypsum and 2% calcium sulphite.

It will be understood that various modifications may be made within the meaning of the above without departing from the spirit of the invention.

What I claim as new and desire to secure by Letters Patent is:

1. In a method of producing bicalcium phosphate by dissolving tricalcium phosphate-containing material in watery sulphurous acid, adding a strong mineral acid to the solution and expelling sulphurous acid therefrom, the step which consists in expelling the sulphurous acid from the solution by contacting it at ordinary temperature with a permanent gas which does not react either with sulphurous acid or with calcium salts.

2. In a method of producing bicalcium phosphate by dissolving tricalcium phosphate-containing material in watery sulphurous acid, adding hydrochloric acid to the solution and expelling sulphurous acid therefrom, the step which consists in expelling the sulphurous acid from the solution by contacting it at ordinary temperature with a permanent gas which does not react either with sulphurous acid or with calcium salts.

3. In a method of producing substantially pure bicalcium phosphate by dissolving tricalcium phosphate-containing-material in watery sulphurous acid, adding hydrochloric acid to the solution and expelling sulphurous acid therefrom, the step which consists in expelling the sulphurous acid from the solution at ordinary temperature by contacting it with atmospheric air.

In testimony whereof I affix my signature.
ERICH THILO.